(12) United States Patent
Schrey et al.

(10) Patent No.: US 11,067,674 B2
(45) Date of Patent: Jul. 20, 2021

(54) DEVICE FOR DETERMINING A DISTANCE TO AN OBJECT AND CORRESPONDING METHOD

(71) Applicant: Fraunhofer-Gesellschaft zur Foerderung der angewandten Forschung e.V., Munich (DE)

(72) Inventors: Olaf Schrey, Ratingen (DE); Maik Beer, Duisburg (DE); Werner Brockherde, Duisburg (DE); Bedrich Hosticka, Muelheim a.d.Ruhr (DE); Alexander Schwinger, Essen (DE); David Arutinov, Bonn (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 547 days.

(21) Appl. No.: 15/896,162

(22) Filed: Feb. 14, 2018

(65) Prior Publication Data

US 2018/0231646 A1    Aug. 16, 2018

(30) Foreign Application Priority Data

Feb. 14, 2017  (DE) .......................... 102017202353.8

(51) Int. Cl.
*G01S 7/486* (2020.01)
*G01S 17/10* (2020.01)
(Continued)

(52) U.S. Cl.
CPC .......... *G01S 7/4865* (2013.01); *G01S 7/4863* (2013.01); *G01S 7/4876* (2013.01); *G01S 17/10* (2013.01); *G01S 17/89* (2013.01)

(58) Field of Classification Search
CPC ...... G01S 7/4863; G01S 7/4876; G01S 17/89; G01S 17/10; G01S 7/4865
(Continued)

(56) References Cited

U.S. PATENT DOCUMENTS

2017/0234973 A1*  8/2017  Axelsson ................ G01S 17/89
356/5.01

FOREIGN PATENT DOCUMENTS

DE    102014207599 A1    10/2015
EP    2708913 A1    3/2014
(Continued)

OTHER PUBLICATIONS

C. Niclass, M. Soga, H. Matsubara, S. Kato, und M. Kagami, „A 100-m Range 10-Frame/s 340×96-Pixel Time-of-Flight Depth Sensor in 0.18-CMOS, Feb. 2013.
(Continued)

*Primary Examiner* — Daniel L Murphy
(74) *Attorney, Agent, or Firm* — Michael A. Glenn; Perkins Coie LLP

(57) ABSTRACT

Described are a device for determining a distance to an object, having a transmitting device for emitting signals, a receiving device for receiving signals and for generating detection signals, an evaluating device for evaluating the detection signals of the receiving device, and a control device for controlling the evaluation of the detection signals, and a corresponding method. The receiving device has a plurality of receiving elements which generate, in case they receive a signal, a detection signal each. The evaluating device determines the distance to the object in accordance with the time-of-flight method and while considering coincidence events and uses that case in which a number of detection signals generated within a presettable coincidence time at least equals a presettable coincidence depth, as a coincidence events. The control device is configured to
(Continued)

determine, starting from a background radiation measurement, a new value for the coincidence time and/or, if applicable, the coincidence depth and preset same for the evaluating device, wherein, in a background radiation measurement, the receiving device receives signals and generates background radiation detection signals.

13 Claims, 9 Drawing Sheets

(51) Int. Cl.
| | |
|---|---|
| *G01S 17/89* | (2020.01) |
| *G01S 7/4865* | (2020.01) |
| *G01S 7/4863* | (2020.01) |
| *G01S 7/487* | (2006.01) |

(58) Field of Classification Search
USPC ........................................ 356/5.01
See application file for complete search history.

(56) References Cited

FOREIGN PATENT DOCUMENTS

| EP | 2605034 B1 | 4/2014 |
| WO | 2010/149593 A1 | 12/2010 |

OTHER PUBLICATIONS

D. Bronzi, F. Villa, S. Tisa, A. Tosi, F. Zappa, D. Durini, S. Weyers, und W. Brock-herde, „ 100 000 Frames/s 64×32 Single-Photon Detector Array for 2-D Imaging and 3-D Ranging, Nov. 2014.

F. Villa, R. Lussana, D. Bronzi, S. Tisa, A. Tosi, F. Zappa, A. Dalla Mora, D. Contini, D. Durini, S. Weyers, und W. Brockherde, CMOS Imager With 1024 SPADs and TDCs for Single-Photon Timing and 3-D Time-of-Flight, Nov. 2014.

* cited by examiner

DEVICE FOR DETERMINING A DISTANCE TO AN OBJECT AND CORRESPONDING METHOD

CROSS-REFERENCE TO RELATED APPLICATION

This application claims priority from German Application No. 10 2017 202 353.8, which was filed on Feb. 14, 2017, which is incorporated herein in its entirety by this reference thereto.

BACKGROUND OF THE INVENTION

The invention relates to a device for determining a distance to an object. Additionally, the invention relates to a method for determining a distance to an object.

CMOS image sensorics offer effective ways of recording measuring signals at high speed in real time. This is of great advantage when recording three-dimensional (3D) distance images in time-critical systems, for example. Pulse time-of-flight methods and methods including continuously modulated light here serve for a contactless depth detection. The time of flight of the infrared laser light, for example, which is emitted by an active radiation source and reflected from a target object is measured. In this context, this is called light detection and ranging (LIDAR).

Fields of application are, for example, in the automotive sector (ADAS systems, automated driving), avionics, medical technology or analytics. High requirements to reliability are posed in particular in security-relevant systems. In emergency brake systems, distances to objects located in front of a car have to be detected in real time and reliably.

Another difficulty which has to be dealt with in systems in automobiles, for example, is the high dynamics and intensity of the background light. Thus, the intensity when entering a tunnel, for example, changes by several orders of magnitude within fractions of seconds. This can be dealt with using 3D-CMOS image sensors. Previous CMOS distance measuring methods are able to record distance images at a very high rate (up to several kfps), which only makes possible many applications in the automotive sector.

Existing 3D sensors having single-photon avalanche diodes (SPAD) use different measuring principles. In indirect methods, similarly to a classical photo diode, incident light is integrated, which, in the context of SPAD, is realized by counting the incident photons [1]. In direct methods, the time of flight of the light emitted is detected by means of an electronic timer (Time-to-Digital Converter, TDC). The TDC here is started when emitting a short laser pulse and stopped when receiving the pulse reflected at a target object. Stopping the TDC occurs with the first incident photon detected by the sensor after starting the TDC [2]. In ideal conditions, the time measured corresponds to the light time of flight and can be transferred directly to the distance between sensor and target object making use of the relation between the distance d, the speed of light c and the measured time t: $d=c*t/2$.

Under the influence of environmental or background light, overlapping of the reflected laser signal by the background light has the result that the TDC is stopped by background photons with a certain probability, which results in an erroneous measurement of the time of flight.

Systems based on a scanner function have been developed for being used with high background light. A laser beam with a small aperture angle here is moved across the visual field of the sensor in order to detect the distance to one or several image points or pixels. Due to the spatial concentration of the optical power of the laser, a higher signal-to-background ratio (SBR) and, consequently, a higher coverage range of the system can be achieved [3]. The temporal and spatial correlation of the photons incident in the pixel, which is referred to as coincidence (or concurrence) is additionally used for an additional suppression of background light in [3]. Since the TDC is stopped only in case of detecting at least two photons within a time period of 4 ns or 8 ns referred to as coincidence depth and coincidence time, erroneous time-of-flight measurements caused by detecting background photons can be reduced.

A problem of this method is that the probability of detecting the reflected laser signal is reduced at the same time, which results in problems in particular with low optical signal intensities as occur with large distances due to the distance dependence of the signal power, or with objects of low reflectance. This shows in a decrease in range from roughly 100 m to 68 m when reducing the reflectivity from 100% to 9% in the system presented in [3]. If the reflected light is attenuated too much, the laser pulse will no longer be detected and no measurement be possible. In order to be able to measure high distances or low reflectances a high SBR (Signal-to-Background Ratio) is used, which can be achieved by a high power density of the laser.

When using illuminators which illuminate the entire sensor visual field all at once (FLASH LIDAR), the high SBR usually cannot be achieved due to eye safety or limited laser power, which is why the range of the system is reduced.

WO 2010/149593 A1 describes a method for increasing the dynamic range of the sensor by adapting the photon detection probability (PDP) to the intensity of background light. This allows detecting weak signals by increasing the PDP. The method offers a way of measuring a distance using different reflectances. When changing the PDP, however, the SBR remains uninfluenced, which is why the range cannot be increased for all reflectances. Adapting the PDP is done by changing the bias of the avalanche photodiode (APD). Measuring the background light intensity is performed by counting the incident photons within a certain time period and subsequently comparing the count to a defined threshold value. In this method, continuous adjustment control of the bias is used due to the break-down voltage of the APD being dependent on the temperature.

EP 2 605 034 B1 describes a device for time-of-flight measurement of optical impulses where two receiving elements are provided. The receiving elements in one implementation are arranged so closely next to each other that they are able to receive a beam of light together. Only such measurements are used here which take place at the same time in both receiving elements, within preset (or predetermined) tolerance limits.

A device for distance measurement is disclosed in EP 2 708 913 A1. Groups of photodiodes are formed here and evaluated together relative to coincidence events. The coincidence events here refer to tolerance time windows. The time window here is in the order of magnitude of the pulse width of the light impulse transmitted. In addition, a minimum number of diodes of groups which have to record a photon within the time window is defined in order for it to be evaluated to be an event. In one implementation, this minimum number is to be adapted to the light conditions. In addition, the number of diodes belonging to a group may also be preset in dependence on the environmental conditions.

SUMMARY

According to an embodiment, a device for determining a distance to an object may have: a transmitting device for emitting signals, a receiving device for receiving signals and for generating detection signals, an evaluating device for evaluating the detection signals of the receiving device, and a control device for controlling the evaluation of the detection signals of the receiving device by the evaluating device, wherein the receiving device has a plurality of receiving elements, wherein the receiving elements are configured to, in case they receive a signal, generate a detection signal each, wherein the evaluating device is configured to determine the distance to the object in accordance with the time-of-flight method and while considering coincidence events, wherein the evaluating device is configured to use that case in which a number of detection signals generated within a presettable coincidence time at least equals a presettable coincidence depth, as a coincidence event, wherein the control device is configured to determine, starting from a background radiation measurement, a new value for the coincidence time and preset same for the evaluating device, and wherein, in a background radiation measurement, the receiving device receives signals and generates background radiation detection signals.

Another embodiment may have a method for determining a distance to an object, wherein signals are emitted, wherein signals are received and, starting therefrom, detection signals are generated, wherein the distance to the object is determined from the detection signals in accordance with the time-of-flight method and while considering coincidence events, wherein that case in which a number of detection signals generated within a presettable coincidence time at least equals a presettable coincidence depth is used as a coincidence event, and wherein, starting from a background radiation measurement, the coincidence time and/or the coincidence depth are/is determined.

The invention achieves the object by a device for determining a distance to an object. The device has: a transmitting device for emitting signals, a receiving device for receiving signals and for generating detection signals, an evaluating device for evaluating the detection signals of the receiving device, and a control device for controlling the evaluation of the detection signals of the receiving device by the evaluating device. Thus, the receiving device comprises a plurality of receiving elements. The receiving elements are configured to generate a detection signal in each case of receiving a signal. The evaluating device is configured to determine the distance to the object in accordance with the time-of-flight method and while considering coincidence (or concurrence) results. Additionally, the evaluating device is configured to use each case for which the number of detection signals generated within a presettable coincidence time at least equals a presettable coincidence depth, as a coincidence result. The control device is configured to determine, starting from a background radiation measurement, a new value for the coincidence time—and, in one implementation, also a new value for the coincidence depth—and preset same for the evaluating device. Thus, in background radiation measurements, the receiving device receives signals and generates background radiation detection signals.

The background radiation measurement refers to signals originating from background light, and not from the transmitting device. Thus, with a background radiation measurement, one implementation provides for the receiving device to receive signals free from emitting signals by the transmitting device and to generate corresponding background radiation detection signals. In this implementation, when measuring background radiation, no signals are emitted by the transmitting device. In an alternative or additional implementation, when measuring background radiation, that signals coming from the transmitting device are either not received by the receiving device or, after receiving, filtered out and/or eliminated by processing—for example mathematically. The latter implementation may also be performed in combination with an actual distance measurement. In the latter implementation, the receiving device receives signals some of which are used for background radiation measurements and others for actually determining the distance.

In the inventive device, starting from a background radiation measurement, at least the coincidence time—and maybe, in one implementation, the coincidence depth as well—is determined and reset. When measuring background radiation, those signals occurring without signals emitted by the device are evaluated. Consequently, the received signals cannot be reflected signals so that the signals are signals from the environment, i.e. background signals.

An advantage of such a suppression of background light is the accompanying reduction in the laser power used for the light emitted.

One implementation is for the control device to be configured so as to determine, starting from a background radiation measurement, a new value for the coincidence time and a new value for the coincidence depth and preset same for the evaluating device.

In one implementation, the invention is exemplarily part of a 3D measuring method which reduces the disturbing influence of background light and increases the dynamic range of the sensor by making use of the temporal correlation between incident photons on SPAD pixels. In particular, in the method presented, the coincidence time and, maybe, the coincidence depth are adapted to the intensity of the background light during operation of the measuring system. In contrast to the fixed coincidence time and coincidence depth in [3], adapting the parameters allows detecting weak signals, which improves the performance of the system with high distances and low reflectance, or allows using a lower laser power.

In contrast to the method presented in WO 2010/149593 A1, making use of the coincidence for extending the dynamic range, depending on the parameters selected, additionally causes an increase in SBR and, consequently, an increase in range of the system. Furthermore, the coincidence time and coincidence depth parameters are not dependent on the temperature, which make regulation thereof considerably easier.

In one implementation, when measuring background radiation, it is provided for the evaluating device to evaluate the background radiation detection signals using a current coincidence time and a current coincidence depth. The control device is configured to compare a number of background radiation detection signals obtained when measuring the background radiation to an event set value. In addition, the control device is configured to, in case the number of background radiation detection signals and the event set value differ beyond a presettable threshold value, starting from the number of background radiation detection signals, determine at least the coincidence time and/or the coincidence depth. The event set value as a guide value for the number of signals received during background radiation measurement can be preset correspondingly. The current values are the respective set values the applicability of which relative to the background light occurring at present is checked on by the background radiation measurement. The new values are the corresponding currently determined values which fit the currently present background light such that effects of the background light on the distance measurement are minimized.

One implementation is for the control device to be configured to, in case the number of background radiation detection signals is greater than the event set value, decrease the current coincidence time for determining the new value of the coincidence time. Alternatively or additionally, the control device is configured to, in case the number of background radiation detection signals is smaller than the event set value, increase the current coincidence time for determining the new value of the coincidence time. In this implementation, it is checked at first whether the number of background radiation detection signals—as a real value of background radiation—differs from the event set values—as a set value of background radiation—beyond a presettable threshold value—defined as the tolerance range. When the deviation between the real value and the set value is above the tolerance range, it is checked on whether the real value is greater than the set value or whether the real value is smaller than the set value. Starting from this, the coincidence time is decreased or increased.

In one implementation, it is provided for the control device to be configured to, in case the current coincidence time reaches a presettable maximum threshold value, decrease the current coincidence depth for determining the new value of the coincidence depth, and set the new value of the coincidence time to a presettable minimum value. Alternatively or additionally, the control device is configured to, in case the current coincidence time reaches a presettable minimum threshold value, increase the current coincidence depth for determining the new value of the coincidence depth and to set the new value of the coincidence time to a presettable maximum value. In one implementation, the coincidence depth which may be a natural integer, is increased or decreased by a count of one.

One implementation is for the control device to be configured to determine the new value for the coincidence time and/or the new value for the coincidence depth using the number of background radiation detection signals which results while considering coincidence events. In this implementation, only such detected signals which are valid as coincidence events will be evaluated further. When, for example, x signals are detected during the background radiation measurement and when, using the current data for coincidence time and coincidence depth, only y coincidence events (y being smaller than x) are determined, in one implementation, only the number of coincidence events, i.e., in this case y, will be used.

In one implementation, it is provided for the control device to be configured to use, at least for determining the new value of the coincidence time (and/or the new value of the coincidence depth), the number of all the background radiation detection signals which result in the background radiation measurement, without considering coincidence events. In this implementation, the control device uses all the signals detected during the background radiation measurement and, in particular, not only that signals resulting as coincidence events.

One implementation is for the control device to be configured to determine the new value of the coincidence time and/or the new value of the coincidence depth using data stored in a data storage, in dependence on the number of background radiation detection signals. In one implementation, the data are a type of table where a value for the coincidence time and the coincidence depth each is associated to a measured event rate—i.e. the number of background radiation detection signals measured or reduced by considering coincidence events.

In one implementation, it is provided for the control device to be configured to cause a background radiation measurement before each distance measurement. Starting here, in one implementation, matching to the respective current values for coincidence time and/or coincidence depth is performed and, if applicable, a new value determined.

One implementation is for the receiving elements (like diodes) of the receiving device to be associated to several image elements (so-called pixels) and for the receiving device to be configured such that, when receiving signals, a number of receiving elements per pixel activated for receiving the signals equals the set coincidence depth.

In one implementation, it is provided for the receiving elements to be associated to pulse shapers of various pulse width and for the pulse shapers, in case the associated receiving elements receive signals, to each generate a pulse having the coincidence time as pulse width.

One implementation is for the receiving elements to be avalanche photo diodes.

In one implementation, it is provided for the transmitting device to comprise an infrared light laser. In one implementation, the signals emitted by the device are infrared light signals.

In addition, the invention achieves the object of defining a method for determining a distance to an object.

The method here comprises at least the steps of:
 emitting signals,
 receiving signals and, starting therefrom, generating detection signals, and
 determining the distance to the object from the detection signals using the time-of-flight method and while considering coincidence events.

That case where the number of detection signals generated within a presettable coincidence time at least equals a presettable coincidence depth is used as a coincidence event.

Additionally, starting from a background radiation measurement, the—presettable or to-be-preset—coincidence time and/or coincidence depth is determined. In one implementation, in the background radiation measurement, signals free from a previous emission of signals are received.

The above implementations of the device may correspondingly also be realized by the method so that the above expositions correspondingly also apply to the method.

The invention is to be described again in other words:

The invention relates to a distance measurement using the time-of-flight method, wherein the time of flight of signals (in one implementation, particularly infrared laser light) is measured while considering coincidence events.

In order to decrease the effects of background light, the coincidence time and, if applicable, the coincidence depth may be set individually for the prevailing conditions—in one implementation even for each measurement. The coincidence depth here is the number of receiving elements (like diodes) which indicate recording of a photon within the coincidence time. The coincidence time is that time within which the recording of photons is considered to be simultaneous.

In one implementation, at least one distance measurement comprises the following four steps:
1. Measuring the background light (with or without considering coincidence events).
2. Determining a coincidence time and, in one implementation, the coincidence depth as well.
3. Setting—maybe only current values for—the coincidence time and, if applicable, the coincidence depth as well.
4. Measuring the time of flight or distance using the values set.

Measuring the background light in step 1 is performed with or without considering coincidence events, in dependence on the implementation. In one implementation, this influences determining the values in step 2.

In one implementation, a goal of determining the values in step 2 is for the background light to generate as little coincidence events as possible.

Step 2 exemplarily comprises the following two implementations:
- If the background light is measured in step 1 with coincidence events, the event rate determined as the number of coincidence events is compared to a set value (the event set value). If the two values differ beyond a tolerance threshold value, the coincidence time is changed in dependence on the relation between the values. If the coincidence time reaches a minimum or maximum value, the coincidence depth is changed.
- With measurements without coincidence events in step 1, stored number values are retrieved, using the event rate determined.

In one implementation, it is provided, for the actual measurement in step 4, for those receiving elements which do not contribute to the coincidence measurement to be switched off. In one implementation, steps 1 and 4 are performed simultaneously, wherein step 1 of a subsequent distance measurement coincides with step 4 of the present distance measurement. Thus, the parameters of a previous measurement and evaluation of the background light are taken as a basis for the present or current distance measurement.

BRIEF DESCRIPTION OF THE DRAWINGS

Embodiment of the present invention will be detailed subsequently referring to the appended drawings, in which.

DETAILED DESCRIPTION OF THE INVENTION

Figure 1:
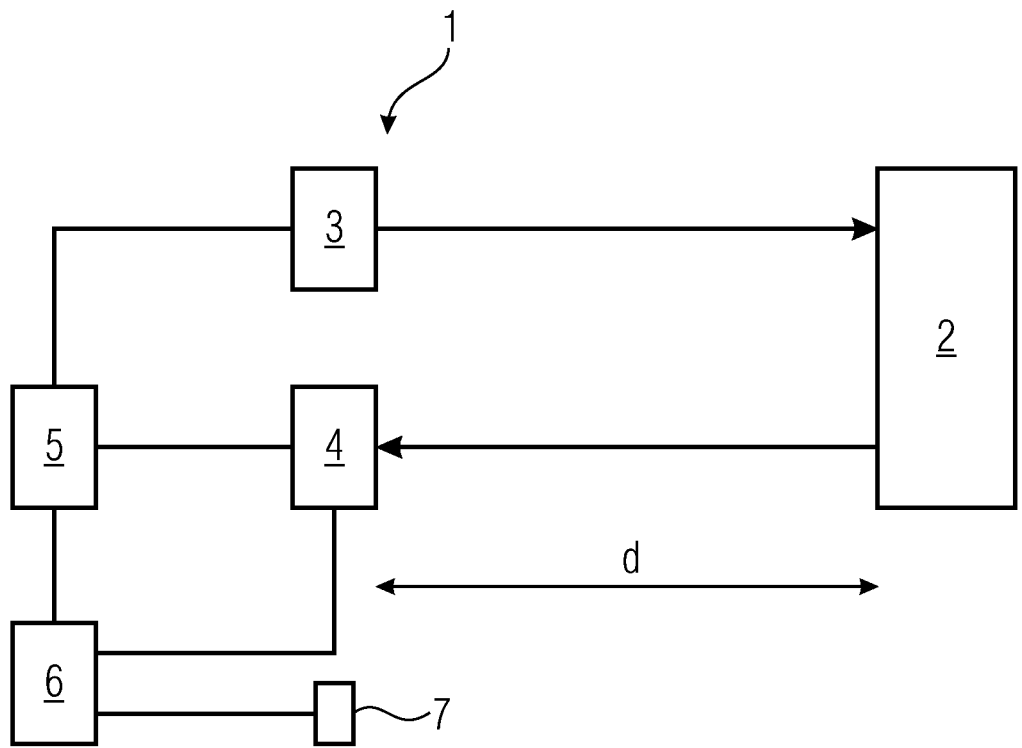
FIG. 1 is a schematic illustration of a device for determining a distance to an object.

One implementation of a device 1 for determining a distance d to an object 2 is shown in FIG. 1. The device 1 comprises a transmitting device 3 and a receiving device 4. The transmitting device 3 transmits signals towards the object 2, which, in the implementation shown, is pulsed infrared laser light. In one implementation, the transmitting device 3 moves the light across a presettable region of the object 2.

The light reflected at the object 2 is received as a signal by the receiving device 4. The path of the light here is indicated by two arrows. The distance to the object 2 results from the time of flight of the light using the speed of the signals emitted, reflected and received again. The time of flight T consequently is the temporal distance between emitting the light by the transmitting device 3 as a starting time $t_0$ and the light impinging on the receiving device 4 as a stopping time $t_1$.

The evaluating device 5 is connected to the transmitting device 3 and the receiving device 4 for determining the distance d. Since the receiving device 4 also receives background light, the evaluating device 5 determines the distance starting from the coincidence events.

The receiving device 4 comprises a plurality of receiving elements 40 (cf. FIG. 2) which each generate a detection signal when recording a photon impinging. When several receiving elements 40 generate detection signals within a presettable coincidence time $\vartheta$, this is considered to be a coincidence event and used for determining the stopping time $t_1$. The minimum number of detection signals detected simultaneously within the coincidence time $\vartheta$ is referred to as coincidence depth n.

For detecting the depth information of an object 2 using the time-of-flight method, for example, the target object 2 is irradiated with a pulses laser source as an exemplary transmitting device 3. Synchronously, an electronic time-measuring device which, in one implementation, is realized as a TDC (time-to-digital converter) is started.

The distance d between the receiving device 4 and the object 2 is decisive for the time of flight of the light pulse emitted by the transmitting device 3 (like a laser source). The signal emitted and the TDC (which may, for example, be part of the evaluating device 5) start simultaneously at the time $t_0$. The laser pulse is reflected at the irradiated surface of the target object 2 and impinges on the photo-sensitive area of the receiving device 4 after the time-of-flight delay $\tau = 2d/c$. The time when the pulse is received $t_1$ here is dependent on the distance d. The TDC—as an exemplary time-measuring device—is stopped when detecting the first photon or the first coincidence event and is subsequently read out.

The implementation of the device 1 illustrated in FIG. 1 allows adapting the coincidence time $\vartheta$ and also coincidence depth n to the prevailing conditions and, in particular, to the specific background illumination. The target of adapting coincidence time and coincidence depth is keeping the rate of events below a certain level by the background. The result is that the TDC will only be stopped by the background radiation at a reasonable portion and false individual measurements can be corrected.

In the implementation shown, this is done using a background radiation measurement where the receiving device 4 in one implementation receives signals, without the transmitting device 3 emitting signals. The measurement by the receiving device 4 consequently is free from signals of the transmitting device 3. In an alternative or additional implementation, the lack of such signals is caused by a type of filtering. The control device 6 evaluates the signals detected in this way in order to set the coincidence time $\vartheta$ and, in the implementation shown, also the coincidence depth n starting from this.

In the embodiment shown, setting the coincidence depth n is also performed in the receiving device 4 since, in the implementation shown, the receiving device 4 is configured such that it activates only that many receiving elements 40 of the image regions (pixels) as correspond to the coincidence depth n.

Figure 2:
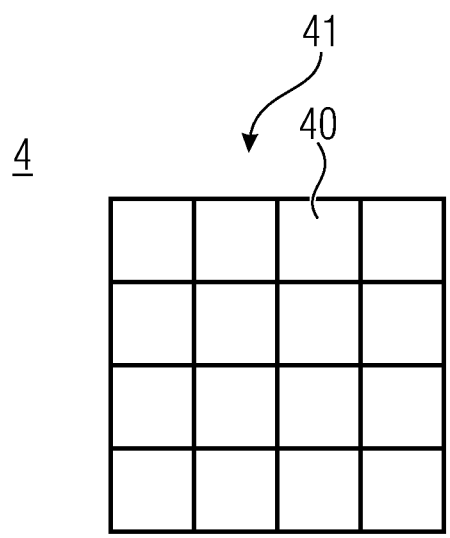
FIG. 2 is a schematic illustration of a setup of a receiving device.

FIG. 2 shows a part of a receiving device 4 comprising the individual receiving elements 40 (like SPAD) belonging to the individual image elements 41 (pixels).

In the implementation of FIG. 1, there is a data storage 7 for storing data for determining the parameters: coincidence time $\vartheta$ and coincidence depth n.

Figure 3:
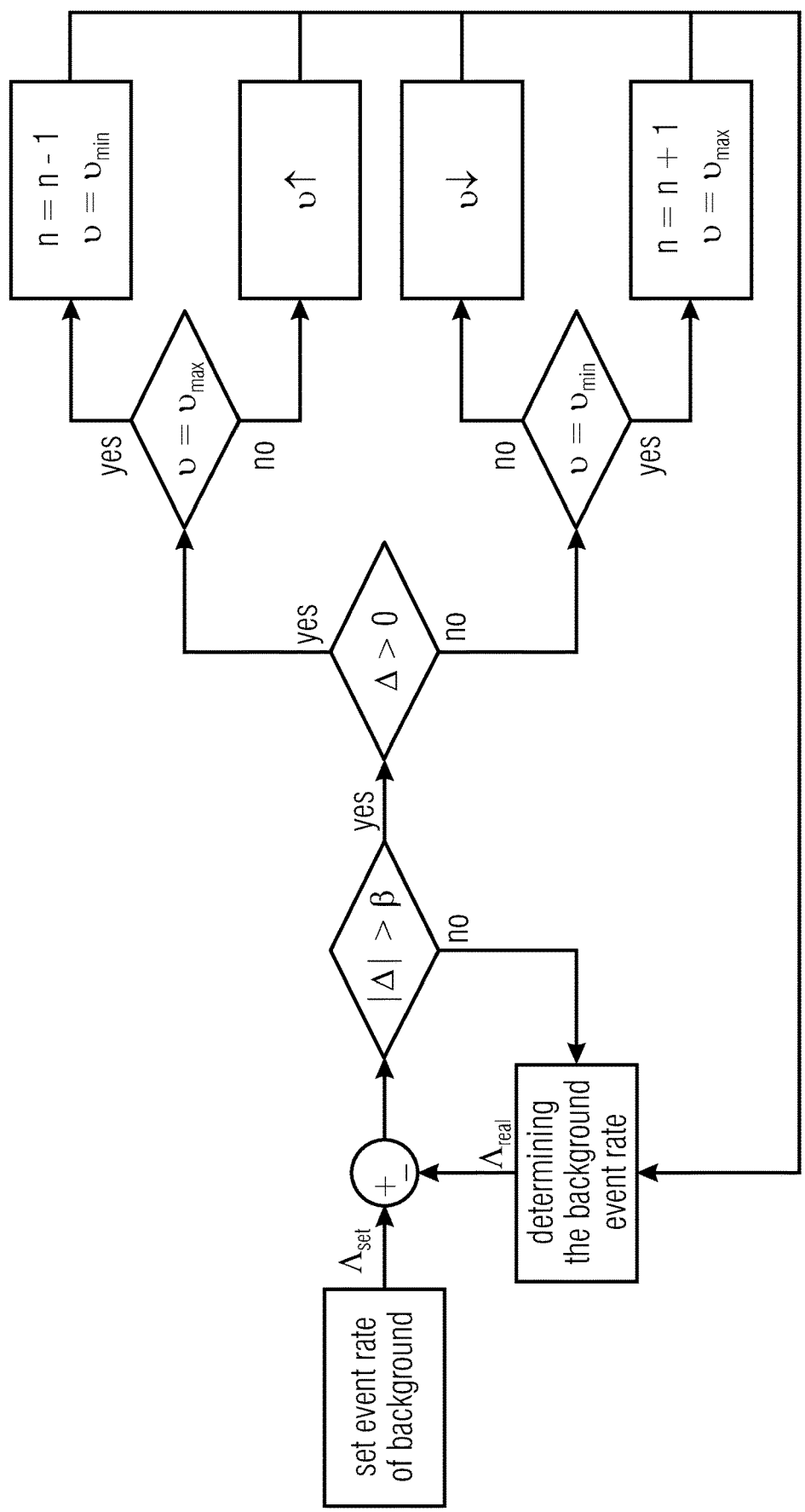
FIG. 3 shows a first exemplary diagram for determining the coincidence time and coincidence depth.

The data storage 7 comprising stored data here is particularly relevant for one of two background radiation measurements:

FIG. 3 shows an exemplary implementation of a process for determining coincidence time and coincidence depth. An event set value $\wedge_{set}$ is preset here (referred to as "set event rate of the background"). The difference $\Delta$ between this value and the currently determined rate of the background light (using the step referred to here as: "determining the background event rate") $\wedge_{real}$ is determined and the magnitude of the difference compared to the presettable threshold value $\beta$. If the magnitude is smaller, a measure of the background light can be determined again—advantageously after a distance measurement which is not indicated here.

In the case of too great a deviation, it is determined whether the difference $\Delta$ is greater than zero, i.e. whether the set event value is greater than the real value measured. Subsequently, it is determined whether the coincidence time $\vartheta$ has already reached a greatest or smallest value. If this is not the case, the coincidence time $\vartheta$ will be increased (indicated by $\vartheta\uparrow$) or decreased (indicated by $\vartheta\downarrow$). In the other case, the coincidence depth n is changed and—in the implementation shown—the coincidence time $\vartheta$ is set to a respective other threshold value (if the coincidence time $\vartheta$ has reached the maximum threshold value $\vartheta_{max}$, for example, it will be set to the minimum threshold value $\vartheta_{min}$).

In the first type of background radiation measurement of FIG. 3, the background radiation is evaluated while considering the coincidence events. This is particularly done using the parameters set already: coincidence time $\vartheta$ and coincidence depth n. The reduced number of background radiation detection signals consequently results from the number of all the detection signals of the receiving device 4, by considering the coincidence. The number is compared to an event set value. If the result is a deviation greater than a presettable threshold value $\beta$, at least the coincidence time $\vartheta$ is determined again—starting from the currently used value. In one implementation, a difference $\Delta$ between the set value and the number of background radiation detection signals is determined to be the real value of the background radiation: $\Delta$="set value–real value". In this implementation, it will then be checked whether the magnitude of the difference $|\Delta|$ is greater or smaller than the presettable threshold value $\beta$ for the deviation.

Thus, in the embodiment shown here, in the case of too great a deviation between the values which are dependent on whether the number of background radiation detection signals is greater or smaller than the event set value, there are two possibilities.

If the number of background radiation detection signals is greater than the event set value, the coincidence time $\vartheta$ will be decreased—if possible. In the implementation mentioned before, this means that the difference is smaller than zero: $\Delta<0$. The decrease in the current value of the coincidence time $\vartheta$ will take place at least if the current coincidence time $\vartheta$ is greater than a minimum threshold value $\vartheta_{min}$. If this minimum threshold value $\vartheta_{min}$ has been reached already, i.e. if the current coincidence time $\vartheta$ already equals the minimum threshold value or if a further reduction of the current coincidence time $\vartheta$ would lead below this minimum threshold value, the coincidence time $\vartheta$ is set to a maximum value $\vartheta_{max}$ and the coincidence depth n is increased. This exemplarily takes place by increasing the coincidence depth by one: $n_{new}=n+1$.

In the opposite case, i.e. if the number of the background radiation detection signals is smaller than the event set value or the difference is greater than zero, the current coincidence time $\vartheta$ will be increased—if possible. If the current coincidence time $\vartheta$, however, is set already to a maximum threshold value $\vartheta_{max}$ or if a further increase would exceed this value, the coincidence time $\vartheta$ will be set to a minimum value $\vartheta_{min}$ which here is identical to the minimum threshold value mentioned before. The maximum threshold value $\vartheta_{max}$ here is the maximum value for the coincidence time mentioned before. In addition, the coincidence depth n is reduced, like by: $n_{new}=n-1$. In one implementation, the maximum threshold value $\vartheta_{max}$ equals the maximum value which the coincidence time $\vartheta$ is set to in the case mentioned before.

Figure 4:
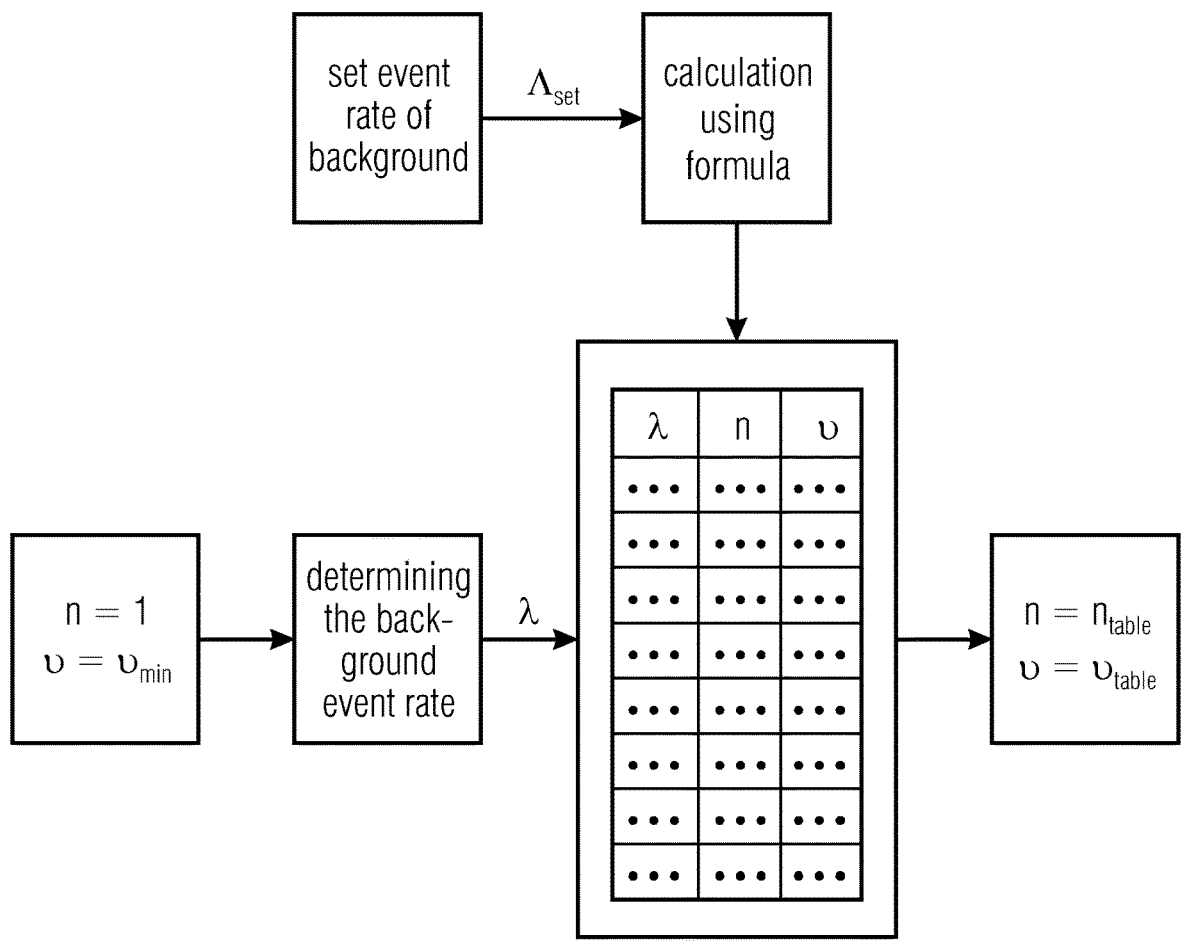
FIG. 4 shows a second exemplary diagram for determining the coincidence time and coincidence depth.

In a second type of background radiation measurement—shown in FIG. 4—coincidence events are not considered, but all the signals received by the receiving device are evaluated (cf. FIG. 1). The number of background radiation detection signals consequently equals the number of signals received by the receiving device. For this case, the control device accesses data stored in the data storage (like in the form of a table), to select, starting from the detection signals obtained, the parameters: coincidence time $\vartheta$ and coincidence depth n, and set the same in the next step in the evaluating device and, in this case also, in the receiving device.

The evaluating device 5 of the implementation of FIG. 1 evaluates the detection signals of the receiving device 4 using the values for the coincidence time $\vartheta$ set by the control device 6 and, in the implementation shown, also for the coincidence depth n.

Setting the coincidence depth n in the receiving device 4 (cf. FIG. 2) allows the receiving device 4 to activate, for receiving the signals, only as many receiving elements 40 of an image element (an alternative term is pixel) 41 for receiving the signals or, in this case, light as correspond to the coincidence depth n. The receiving elements 40 of an exemplary pixel 41 are shown in FIG. 2. In this implementation, not more receiving elements 40 are activated than required. In one implementation, n receiving elements 40 corresponding to the coincidence depth n are activated and, in an alternative implementation, a corresponding number of receiving elements 40 are deactivated so that the number of the activated receiving elements 40 corresponds to the coincidence depth n. The specific activation or deactivation here is independent on the preset coincidence time or coincidence depth.

Figure 5:
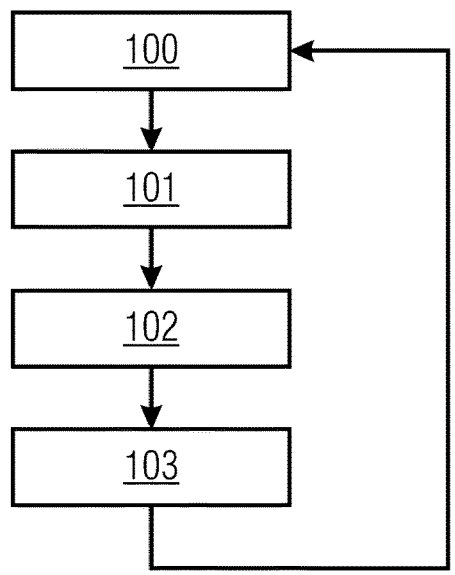
FIG. 5 shows a schematic sequence of steps of the inventive method.

The steps of an implementation of the distance measurement using the inventive method are shown in FIG. 5.

Measuring the intensity of the background light takes place in step 100, wherein no signals are emitted by the measuring device. For this purpose, in one implementation, the incident background radiation on the sensor is integrated with no active illumination by the laser in a preset time window by counting. The rate and, thus, the intensity of the background light can be determined from the number of events and the duration of the measuring window. The integration may be realized both with and without coincidence. Determining the coincidence time and the coincidence depth is performed in step 101 using the detected signals, i.e. using the measured background radiation and, in one implementation, starting from the currently preset values. In step 102, the newly determined values for the coincidence time and the coincidence depth for the subsequent next distance measurement for evaluating the signals received there are set. In step 103, measuring the time of flight of the emitted signals or the distance between the measuring device and the object with the values set in step 102 is performed via the direct method by means of measuring the pulse time of flight. In said step 102, in contrast to step 100, a signal is emitted towards the object as well.

Figure 6:
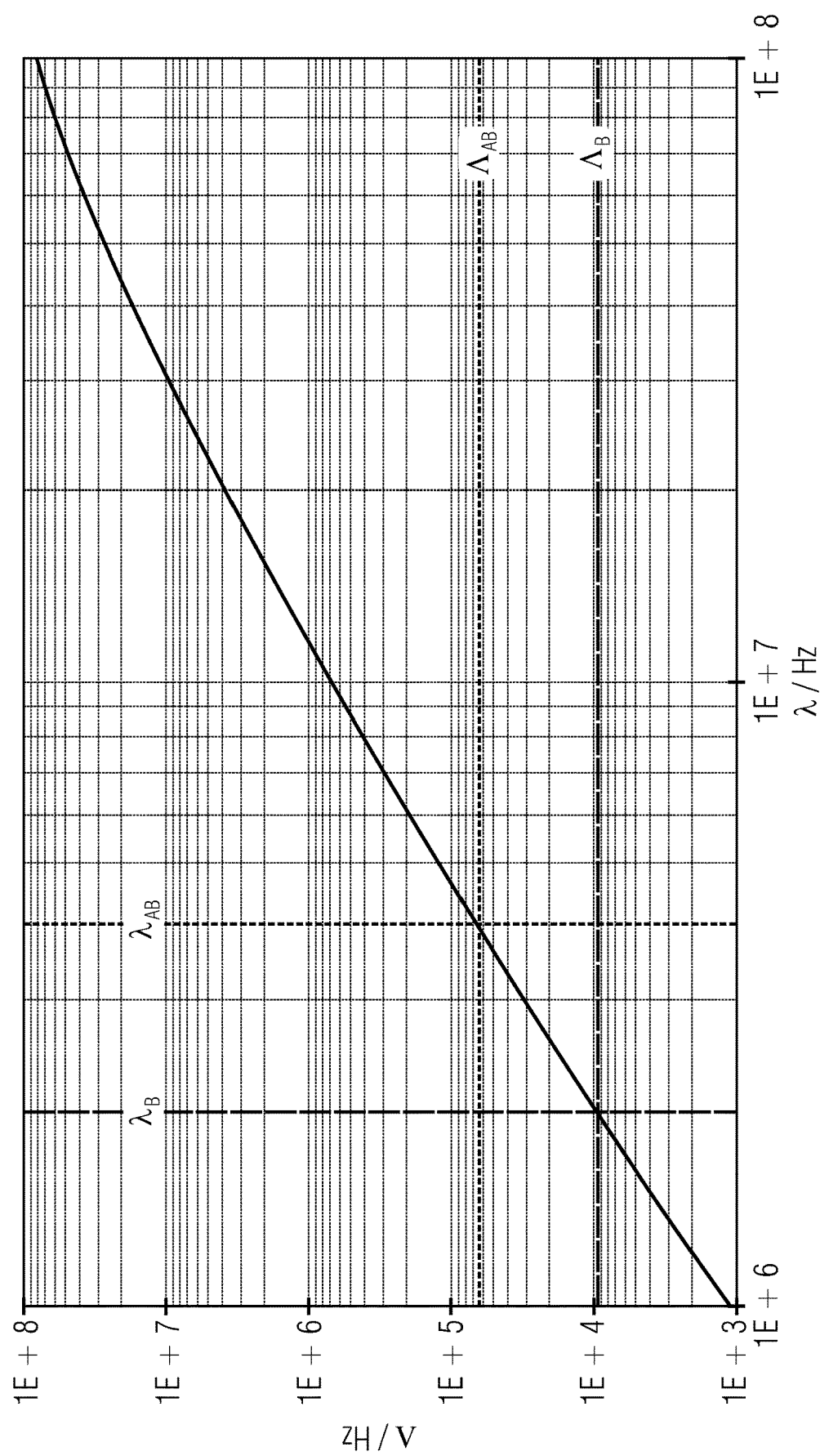
FIG. 6 shows an exemplary course of the net event rate of coincidence events as a function of the photon detection rate.

FIG. 6 shows the net event rate of coincidence events (Λ/Hz) as a function of the photon detection rate, wherein the gross event rate (λ/Hz) is plotted on the x axis. This allows discussing the influence of the background and defining a coincidence model.

Since the photons are subject to a statistical distribution within the reflected pulse, the time of detecting the first photon does not correspond to the arrival of the reflected pulse on the receiving device. In order to reduce the accompanying variance of the measuring value, several measuring values are collected in a histogram from which subsequently the time of flight and the distance are determined. Individuals false measuring values may be tolerated by this procedure when determining the distance.

The temporal distribution of the photons in a flow of constant rate is subject to an exponential distribution. Thus, the time between two subsequent photons and, pursuant to Hitchhiker's Paradox, also the time between any time and the arrival of the next photon is given by:

$$P_{PDF}(t,\lambda) = \lambda \exp(-t\lambda) \quad (1)$$

From this probability density, that probability at which a photon resulting from background light erroneously stops the TDC can be determined. The rate of the background photons $\lambda_B$ is inserted into formula (1) and the same is subsequently integrated from t=0 to t=τ. The result is as follows:

$$P_{False}(\tau,\lambda_B) = 1-\exp(-\tau\lambda_B) = 1-\exp(-2\lambda_B d/c) \quad (2)$$

It shows that the probability of a false measurement increases with an increasing distance d and background intensity $\lambda_B$.

In order to be able to measure greater distances, the rate of detected background photons has to be reduced so strongly that the probability in accordance with formula (2) does not exceed a tolerable value. In addition, the attenuation may not be too high in order for the reflected pulse to be still detected at a certain minimum probability. Only if these two conditions are met will a reliable measurement be obtained.

When using coincidence, the rate of detected events (referred to as net event rate) decreases compared to the case of individual photon detection with no coincidence (referred to as gross event rate).

How strongly the event rates are reduced can be calculated approximately by means of:

$$\Lambda = \left(1 - \prod_{i=1}^{n-1}(N-i)\sum_{k=0}^{n-2}\left(\frac{(-1)^k e^{-(N-n+1+k)\lambda\theta}}{(n-2-k)!k!(N-n+1+k)}\right)\right) * \\ \left(\prod_{i=1}^{n-1}(N-i) * \sum_{k=0}^{n-2}\left((-1)^k \frac{2N-n+1+k-Ne^{-(N-n+1+k)\lambda\theta}}{(n-2-k)!k!(N-n+1+k)^2 N\lambda}\right)\right)^{-1} \quad (3)$$

(without considering the dead time and further saturation effects) from the number of the individual receiving elements (like SPAD) N, the gross event rate of each SPAD λ, the coincidence time ϑ and the coincidence depth n.

For n>1, the formula indicates a gradient of the "Λ=f(λ)" curve of greater than one, which results in a weakening of the reflected pulse less strong than of the pure background light and, thus, in an improvement in SBR.

FIG. 6 shows the rate of coincidence events as a function of the gross event rate of the individual diodes in accordance with the above formula (3).

For illustrating the improvement in SBR accompanying the gradient, the rates of the reflected laser signal and background light are indicated at 2 MHz each, wherein $\lambda_{AB} = \lambda_A + \lambda_B$ applies, which corresponds to an SBR of 1.

The event rate of the background is reduced to approximately 9 kHz by using coincidence.

While receiving the reflected pulse, the gross event rate is 4 MHz, which results in a net event rate of approximately 60 kHz. The SBR, defined as the additional rate during the arrival of the reflected laser pulse, divided by the event rate of the background, is:

$$SBR = \frac{\Lambda_{AB} - \Lambda_B}{\Lambda_B} = \frac{60 \text{ kHz} - 9 \text{ kHz}}{9 \text{ kHz}} = 5.67 \quad (4)$$

Since the gradient of the net event rate increases with the coincidence depth, the increase in SBR also improves. However, with an increased steepness of the curve, the dynamics range used which the electronics in the sensor have to detect increases as well. Using the example of FIG. 6, the increase in dynamics may also be recognized by the steepness of the curve. Thus, a change in the gross event rate of 1 MHz to 10 MHz results in a change in the net event rate of 1 kHz to 800 kHz. Expressed in decibel, this corresponds to an increase in dynamics from 20 dB to 58 dB, which roughly means tripling.

In order for the reflected laser pulse to be detected, it has to exhibit a certain power. In order to achieve this also with low reflectivities, high a power of the laser emitted is used, since the rate is attenuated strongly by applying the constant coincidence. In case of high reflectivity in contrast, the laser power could be reduced since in this case the attenuation by the coincidence is considerably smaller.

Estimating the event set value of the background event rate can be performed using the maximum distance, the number of individual measurements accumulated in the histogram for determining the distance N and the width of the bin $T_{Bin}$. For this purpose, the signal-to-noise ratio (SNR) of the histogram will be considered. Thus, the SNR is defined to be the expected value of the, due to receiving the reflected signal, additional count in the bin, divided by the standard deviation of the entire count, including background events.

The SNR can be calculated from the probability distribution of the first event at a rectangular pulse and constant background rate:

$$SNR_{Hist} = \sqrt{NT_{Bin}e^{\frac{2\lambda_B d}{c}}} \frac{\lambda_A}{\sqrt{\lambda_A + \lambda_B}} \quad (5)$$

with a maximum of $\lambda_B = c*d/2$, assuming a constant SBR, which corresponds to a variation of the reflection factor with a constant distance.

With this background rate $\lambda_B$, the measurement of the distance using the direct method has the best result. Since the event set value achieved in this way is a function of the distance, it is calculated for the maximum distance of the system. Here, the range also depends on the quality of the algorithm used for calculating the distance from the histogram. Up to which SNR the algorithm is able to determine the distance from the histogram with preset precision and reliability, can be determined by further theoretical examinations or by means of simulation.

Figure 7:
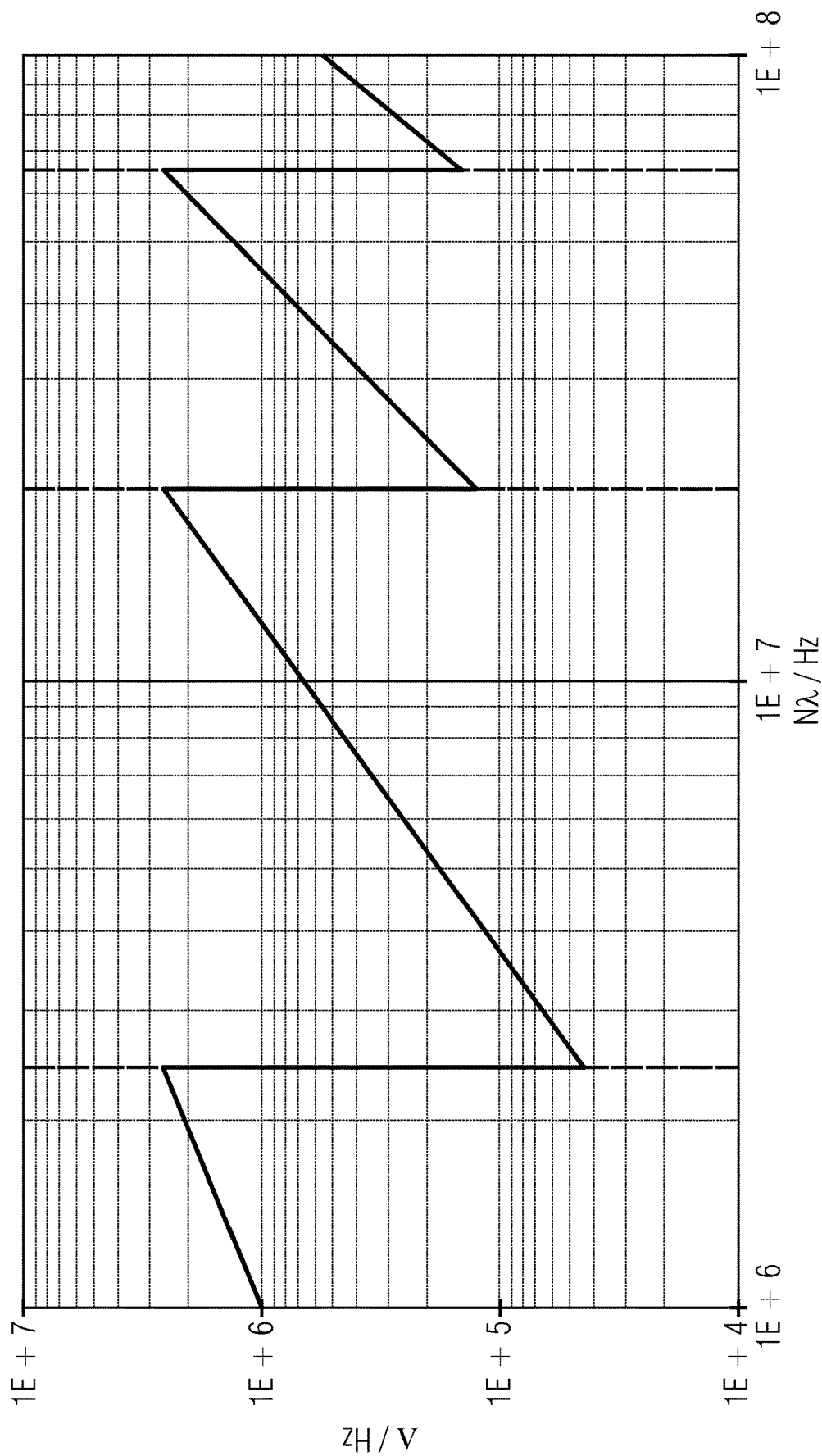
FIG. 7 shows an exemplary course of the net event rate in dependence on the coincidence depth.

FIG. 7 exemplarily shows how the net event rate (plotted on the y axis, $\Lambda$/Hz) can be kept at a relatively constant level by adapting the coincidence depth from n=1 (no coincidence) to n=4 when changing the gross event rate (plotted on the x axis, N*$\lambda$/Hz).

For the real application, the smallest possible waviness of the curve in FIG. 7 is strived for since, apart from the background light, laser light will also be attenuated and the same must not fall below a certain value in order to be detected reliably. A reduction of the waviness in the net event rate can be achieved by additionally adapting the coincidence time.

In order to make the influence of coincidence time and coincidence depth on the resulting event rate more obvious, an approximation of formula (3) will be considered.

For a coincidence depth of n=2, the time between two events needs to be smaller than the coincidence time $\vartheta$. The probability of this can be determined by means of integration from the exponential distribution of time between two subsequent events. When multiplying the probability determined in this way by the original event rate, the result will be:

$$\Lambda_{Approx,2} = \lambda(1 - e^{-\lambda\vartheta}) \approx \lambda^2\vartheta \quad (6)$$

The probability for a coincidence with n=3 in contrast can be calculated from the Erlang distribution. The resulting rate is as follows:

$$\Lambda_{Approx,3} = \lambda(1 - (1+\lambda\vartheta)e^{-\lambda\vartheta}) \approx \lambda^3\vartheta^2 \quad (7)$$

For any coincidence depth n, the result is an approximate proportionality of:

$$\Lambda_{Approx,n} \propto N^n \lambda^n \vartheta^{n-1} \quad (8)$$

This approximation (8) shows how the individual quantities influence the resulting event rate. Thus, the coincidence time $\vartheta$ has a greater influence with higher coincidence depth n than with smaller depths. For eye security and the smallest possible laser power, the attenuation of the reflected pulse may only be as strong as used for decreasing the net event rate of the background radiation to a tolerable level. High waviness reversely uses a higher laser power.

The approximation (8) shows another way of adapting the net event rate by switching off certain receiving elements N or certain sub-pixels. In particular, this technique can be used in order to smooth the transition between no incidence (n=1) and coincidence (n=2) by reducing the active sub-pixels step by step. In general, this offers a further variable for reducing the waviness.

A higher SBR results with higher rates and higher a coincidence depth by changing the steepness of the curve of the net event rate with the coincidence depth in accordance with formula (3), which allows measuring greater distances. The decrease in SBR with an increasing distance remains uninfluenced here.

The increase in SBR with the coincidence depth can be shown using approximations in accordance with formula (6) and formula (7). In case of using a coincidence with n=2, the following applies for the new SBR:

$$SBR_{new,2} = \frac{\lambda_{AB}^2 \vartheta - \lambda_B^2 \vartheta}{\lambda_B^2 \vartheta} = \frac{\lambda_A^2 + 2\lambda_A\lambda_B}{\lambda_B^2} = SBR_{old}^2 + 2SBR_{old} \approx SBR_{old}^2 \quad (9)$$

wherein the result is doubling of the SBR in decibel. In analogy, this calculation can be performed for a coincidence depth of n=3 in accordance with formula (7). The result is:

$$SBR_{new,3} = \frac{\lambda_{AB}^3 \vartheta - \lambda_B^3 \vartheta}{\lambda_B^3 \vartheta} = SBR_{old}^3 + 3SBR_{old}^2 + 3SBR_{old} \approx SBR_{old}^3 \quad (10)$$

which corresponds to tripling of the SBR in decibel. This could be continued with further coincidence depths. In general, when using coincidence events, the resulting SBR increases by the factor of the coincidence depth n.

The invention with an adaptive coincidence time and, maybe, also an adaptive coincidence depth allows an approximately constant range across all reflectances while at the same time reducing the used laser power for the direct measuring method when compared to the case of fixed coincidence in [3]. Adapting the coincidence time and, if applicable, the coincidence depth reduces the attenuation of the signal in the receiving device in the case of a low reflectivity of the target object and thus allows using a lower laser power when compared to the case of constant coincidence time and coincidence depth.

On the other hand, with high a reflectivity and background intensity, the attenuation is increased by adapting coincidence time and coincidence depth, so that the number of false measurements due to the background radiation is reduced to a reasonable amount and, at the same time, the reflected laser pulse is detected reliably.

Figure 8:
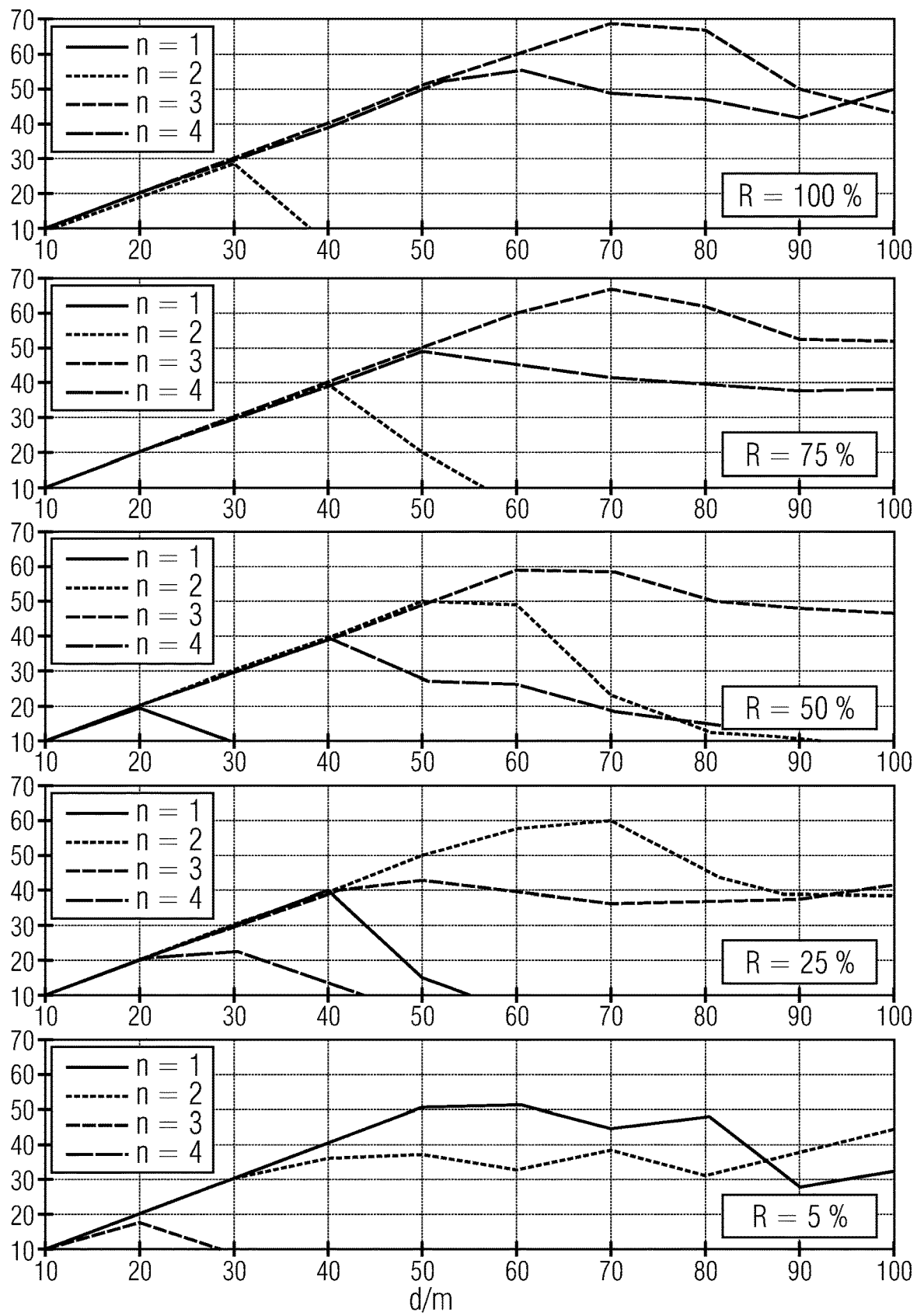
FIG. 8 shows exemplary calculated expected values of the direct measuring method versus the distance (d/m) for different reflection factors (R) and coincidence depths (n)

FIG. 8 shows a simulation of the expected value of the direct measuring method versus the distance for different reflection factors R and coincidence depths n. It can be seen from the simulations that, depending on the reflection factor, different coincidence depths provide an optimum result.

Thus, with a reflectance of R=25%, the measurement with n=2 has good results, whereas, at R=75%, the same coincidence depth falls considerably behind the measurements with n=3 and n=4. The cause of this is too high a rate of background events which are detected at the lower coincidence depth and consequently result in erroneous measurements. Since these false measurements advantageously are located at low distances, the expected value decreases with an increase thereof.

In addition, the simulation in FIG. 8 shows an increase in range with higher reflectances and, consequently, higher coincidence depths. Thus, the maximum distance with R=5% is approximately 50 m, whereas approximately 70 m are obtained with R=100%. When compared to WO 2010/149593 A1, for example, the method presented here allows an increase in range and easier control of coincidence time and coincidence depth, due to the temperature independence thereof.

What follows are technical realizations of the inventive device.

A first example relates to a CMOS line sensor comprising four receiving elements (or so-called sub-pixels) and the realization using SPAD.

Figure 9:
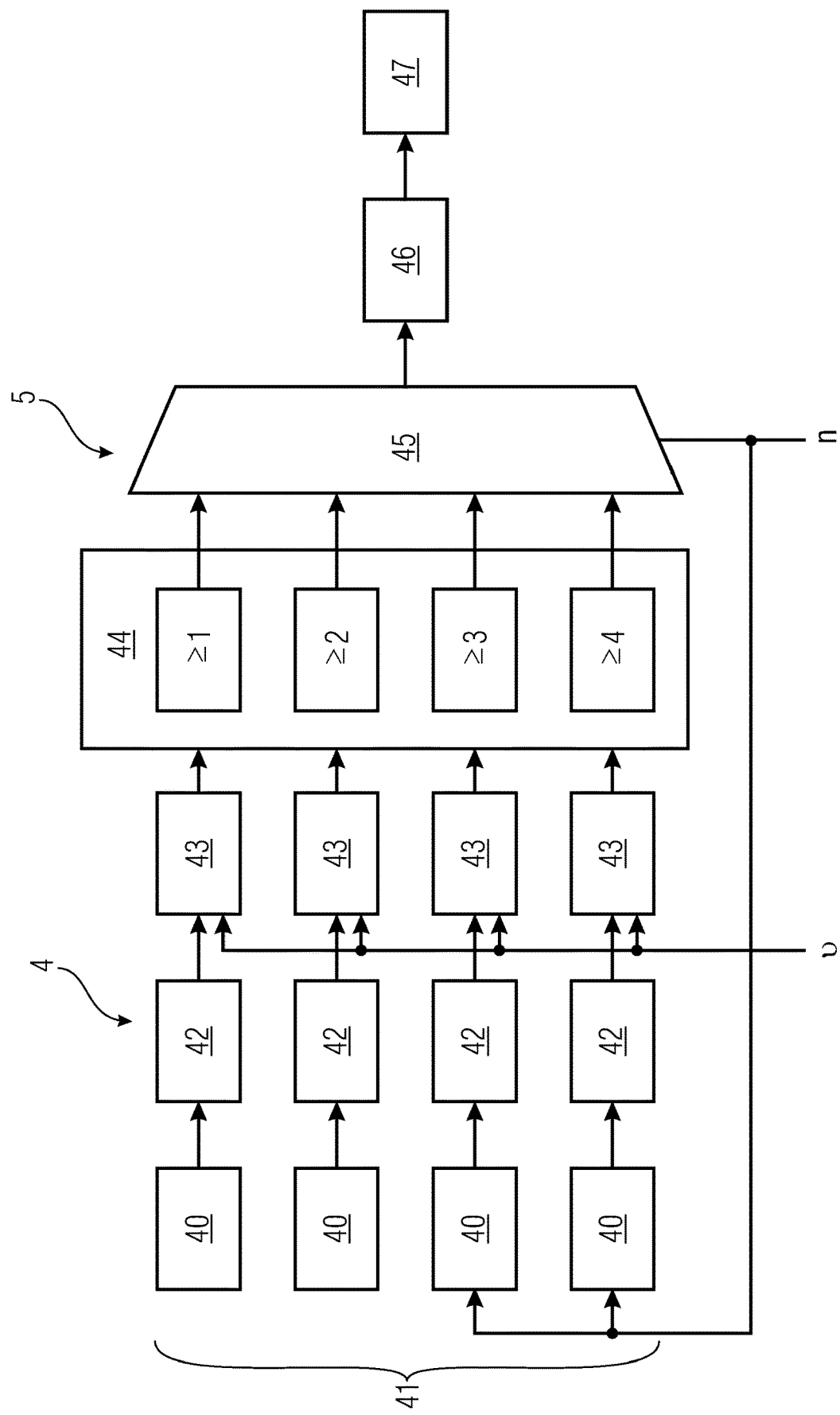
FIG. 9 is a block circuit diagram of an implementation of a sensor pixel for realizing the inventive method, or as a part of the inventive device.

FIG. 9 shows the schematic structure of an image element (different term: pixel) 41 consisting of four individual SPADs 40 as receiving elements. Each individual diode 40 has its own circuit for deleting the diode current and resetting the diode voltage (active quenching and reset, AQR). Two of the four sub-pixels 40 here are implemented so as to be deactivated with an inactive coincidence, which is how the transition between no coincidence and coincidence in the net event rate is smoothed. An AQR 42 follows after each diode 40. A pulse shaper 43 of variable pulse width which is set using an external control signal follows after each AQR 42.

When a receiving element 40—here in the form of a SPAD—detects a photon, the respective pulse shaper 43 will provide a pulse of a set duration. The duration corresponds to the coincidence time $\vartheta$. The actual circuit 44 for detecting coincidence events (concurrence detection circuit, CDC) follows after the pulse shapers 43.

In order to be able to vary the coincidence depth n, the CDC 44 has several sub-blocks of which each is responsible for a different coincidence depth ($\geq 1$, $\geq 2$, $\geq 3$, $\geq 4$). Detecting the coincidence is realized using simple logic elements. The circuit block will only provide a high signal at the output if at least as many inputs as correspond to the respective coincidence depth comprise a high signal. Selecting the coincidence depth n takes place by means of a downstream multiplexer 45 which outputs the output signal of the block of the depth chosen.

Another pulse shaper 46 follows after the multiplexer 45 since the logic combination of the signals may result in very short pulses which, without shaping, would not be processed correctly by following electronics. What follows are further circuit blocks which, on the one hand, serve for counting the pulses and, on the other hand, for measuring the time of flight of the laser pulse. This is done here using digital signal processing 47.

Figure 10:
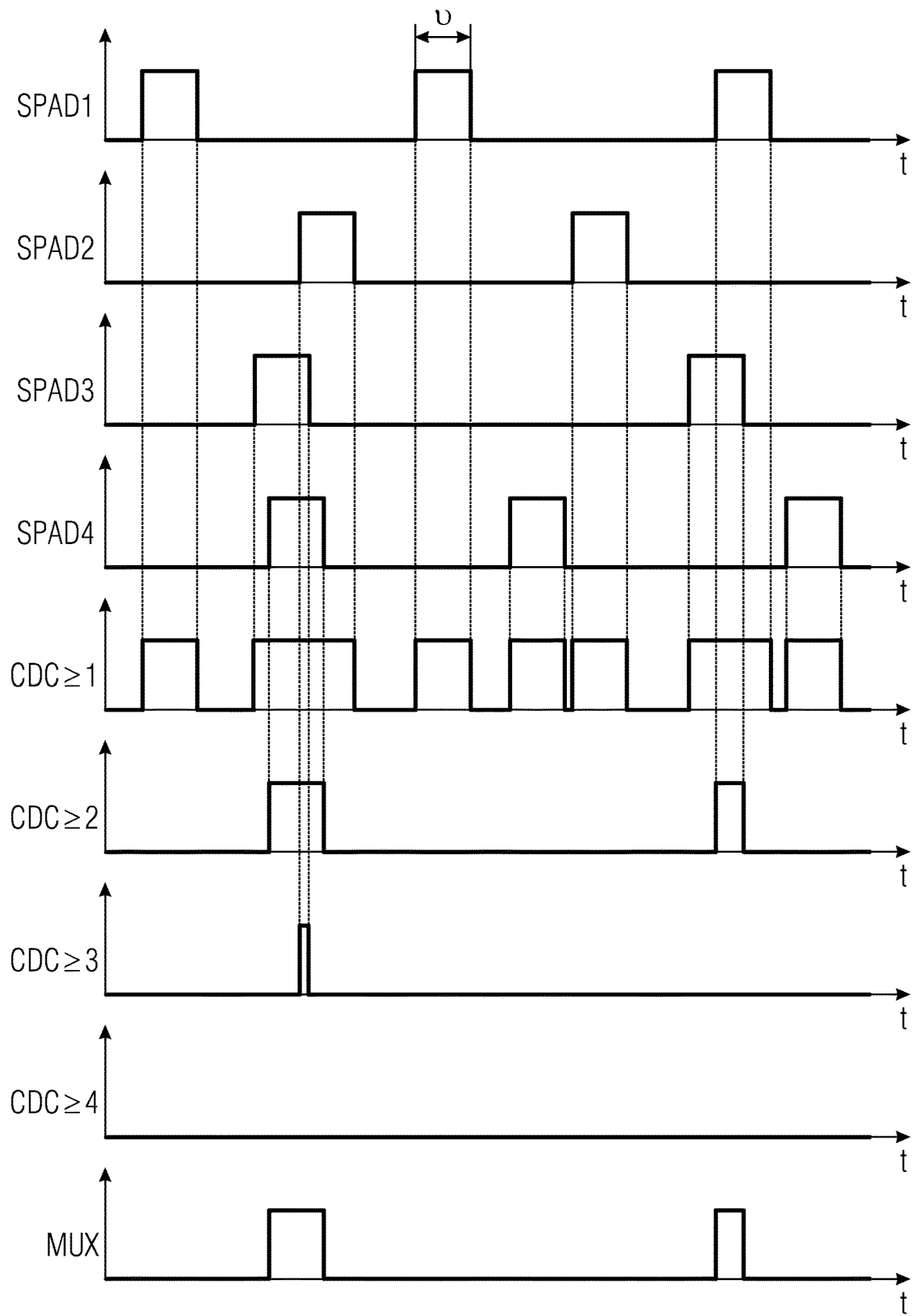
FIG. 10 shows an exemplary course of the relevant signals of the arrangement of FIG. 9.

Examples of signals as occur in the arrangement of FIG. 9 are shown in FIG. 10.

The signal timelines at the outputs of the four pulse shapers 43 (SPAD1 to SPAD4), of the four coincidence detection circuits CDC$\geq$1 to CDC$\geq$4) as parts of the CDC 44 for coincidence depths n=1 to n=4, and the output of the multiplexer 45 are shown exemplarily.

In the example shown, a coincidence depth of n=2 is set. In this case, the output of the multiplexer 45 corresponds to the output of the circuit block for detecting a coincidence with the coincidence depth of n=2.

As has been described before, the coincidence time is defined by the duration of the output pulse of the pulse shaper which has to be identical for all pulse shapers 43. Determining the coincidence and coincidence depth in one implementation is performed pursuant to the principle of a lookup table. A table is stored in an FPGA which is responsible for driving the sensor part of the device for determining the distance, wherein the corresponding values for coincidence time and coincidence depth are retrieved from said table after each measurement of the background light.

Figure 11:
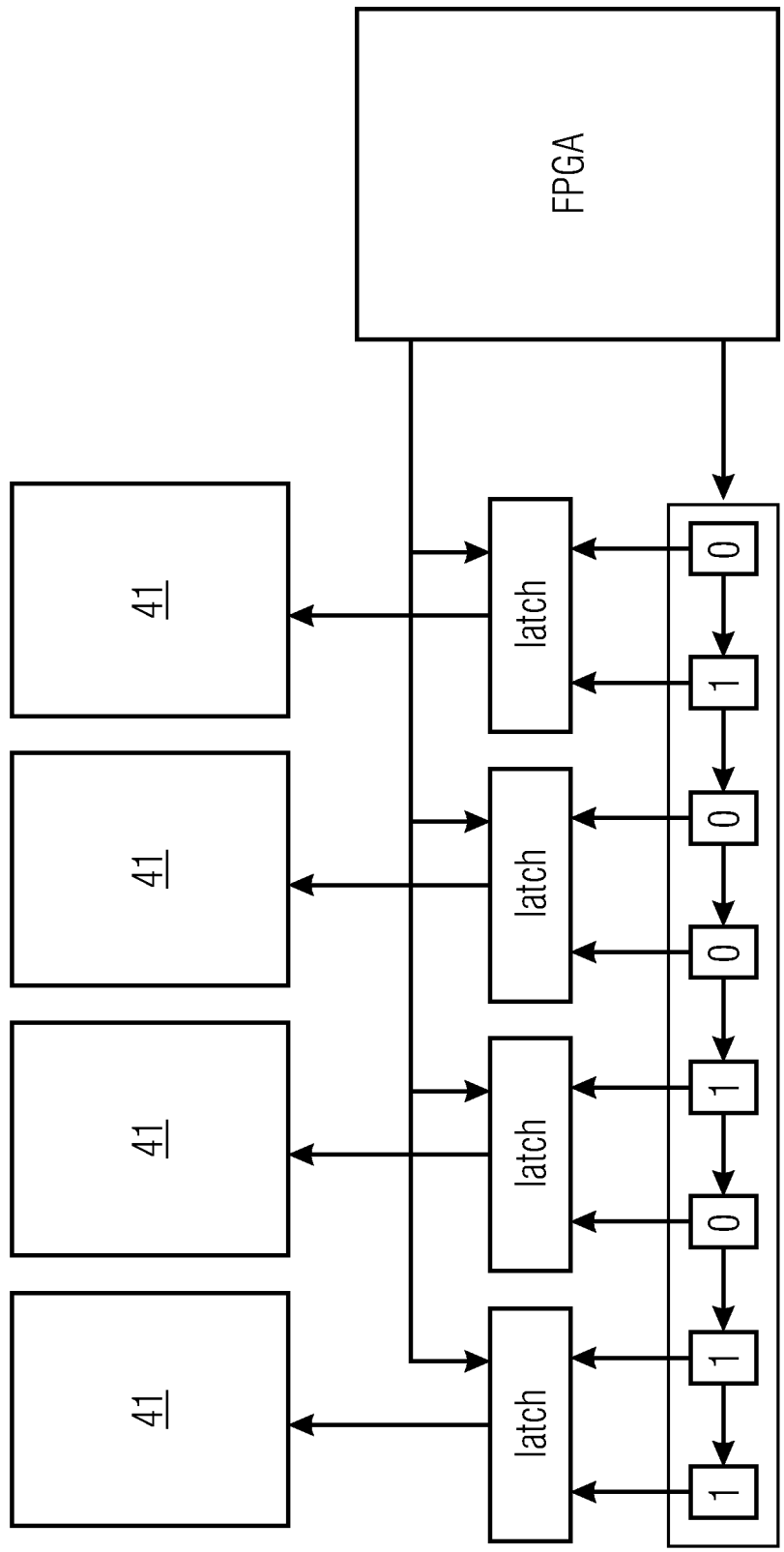
FIG. 11 shows an exemplary sensor line having four pixels and registers for setting coincidence time and coincidence depth.

Setting the values is performed, as is illustrated in FIG. 11, using a shift register which contains the information for the complete pixel line and is written to serially by the FPGA. Latches which take the value of the shift register at a defined time are used for buffering the values. This allows achieving synchronous data transfer and a way of writing to the shift register during an ongoing measurement.

The method presented may, apart from the embodiment mentioned of an integrated CMOS sensor, also be integrated by means of silicon photomultipliers (SiPM) or avalanche diodes (APD) or be realized in a distributed manner using discrete devices, or as a pure computer program. The method may also be employed in 3D hybrid integration by means of wafer-to-wafer, chip-to-wafer or chip-to-chip bonding with respective readout combinatorics, and in different technologies like CMOS or III-V semiconductors in different structural sizes.

Although some aspects have been described in the context of a device, it is clear that these aspects also represent a description of the corresponding method, such that a block or element of a device also corresponds to a respective method step or a feature of a method step.

Analogously, aspects described in the context of or as a method step also represent a description of a corresponding block or item or feature of a corresponding device. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software or at least partly in hardware or at least party in software. The implementation can be performed using a digital storage medium, for example a floppy disk, a DVD, a Blu-Ray disc, a CD, ROM, PROM, EPROM, EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier or the digital storage medium or the computer-readable medium is typically tangible and/or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises a device or a system configured to transfer a computer program for performing at least one of the methods described herein to a receiver. The transmission can be performed electronically or optically. The receiver may, for example, be a computer, a mobile device, a memory device or the like. The device or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be a universally applicable hardware, such as a computer processor (CPU), or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] D. Bronzi, F. Villa, S. Tisa, A. Tosi, F. Zappa, D. Durini, S. Weyers, and W. Brockherde, "100 000 Frames/s 64×32 Single-Photon Detector Array for 2-D Imaging and 3-D Ranging", IEEE Journal of Selected Topics in Quantum Electronics, vol. 20, no. 6, pp. 354-363, November 2014.
[2] F. Villa, R. Lussana, D. Bronzi, S. Tisa, A. Tosi, F. Zappa, A. Dalla Mora, D. Contini, D. Durini, S. Weyers, and W. Brockherde, "CMOS Imager With 1024 SPADs and TDCs for Single-Photon Timing and 3-D Time-of-Flight", IEEE Journal of Selected Topics in Quantum Electronics, vol. 20, no. 6, pp. 364-373, November 2014.
[3] C. Niclass, M. Soga, H. Matsubara, S. Kato, and M. Kagami, "A 100-m Range 10-Frame/s 340×96-Pixel Time-of-Flight Depth Sensor in 0.18-CMOS", IEEE Journal of Solid-State Circuits, vol. 48, no. 2, pp. 559-572, February 2013.

The invention claimed is:
1. A device for determining a distance to an object,
comprising a transmitting device for emitting signals,
comprising a receiving device for receiving signals and for generating detection signals,
comprising an evaluating device for evaluating the detection signals of the receiving device, and
comprising a control device for controlling the evaluation of the detection signals of the receiving device by the evaluating device,
wherein the receiving device comprises a plurality of receiving elements,
wherein the receiving elements are configured to, in case they receive a signal, generate a detection signal each,
wherein the evaluating device is configured to determine the distance to the object in accordance with the time-of-flight method and while,
a number of detection signals generated within a presettable coincidence time at least equals a presettable coincidence depth,
wherein the control device is configured to determine, starting from a background radiation measurement, a new value for the coincidence time and preset same for the evaluating device,
wherein, in a background radiation measurement, the receiving device receives signals and generates background radiation detection signals,
wherein, in a background radiation measurement, the evaluating device evaluates the background radiation detection signals using a current coincidence time and a current coincidence depth,
wherein the control device is configured to compare a number of background radiation detection signals acquired in the background radiation measurement to an event set value, and
wherein the control device is configured to, in case the number of background radiation detection signals and the event set value differ beyond a presettable threshold value, determine at least the coincidence time and/or the coincidence depth starting from the number of background radiation detection signals.
2. The device in accordance with claim 1,
wherein the control device is configured to determine, starting from a background radiation measurement, a new value for the coincidence time and/or a new value for the coincidence depth and preset same for the evaluating device.
3. The device in accordance with claim 1,
wherein the control device is configured to, in case the number of background radiation detection signals is greater than the event set value, decrease the current coincidence time for determining the new value of the coincidence time, and
wherein the control device is configured to, in case the number of background radiation detection signals is smaller than the event set value, increase the current coincidence time for determining the new value of the coincidence time.
4. The device in accordance with claim 3,
wherein the control device is configured to, in case the current coincidence time reaches a presettable maximum threshold value, decrease the current coincidence depth for determining the new value of the coincidence depth and to set the new value of the coincidence time to a presettable minimum value, and wherein the control device is configured to, in case the current coincidence time reaches a presettable minimum threshold value, increase the current coincidence depth for determining the new value of the coincidence depth and to set the new value of the coincidence time to a presettable maximum value.

5. The device in accordance with claim 1, wherein the control device is configured to determine the new value for the coincidence time and/or the new value for the coincidence depth using the number of background radiation detection signals which results when a number of detection signals generated within a presettable coincidence time at least equals a presettable coincidence depth.

6. The device in accordance with claim 1, wherein the control device is configured to use, at least for determining the new value of the coincidence time, the number of all the background radiation detection signals which result in a background radiation measurement when a number of detection signals generated within a presettable coincidence time does not equal a presettable coincidence depth.

7. The device in accordance with claim 1, wherein the control device is configured to determine the new value of the coincidence time and/or the new value of the coincidence depth using data stored in a data storage, in dependence on the number of background radiation detection signals.

8. The device in accordance with claim 1, wherein the control device is configured to cause a background radiation measurement before each distance measurement.

9. The device in accordance with claim 1, wherein the receiving elements of the receiving device are associated to several image elements, and wherein the receiving device is configured such that, when receiving signals, a number of receiving elements per pixel activated for receiving the signals equals the set coincidence depth.

10. The device in accordance with claim 1, wherein pulse shapers of variable pulse widths are associated to the receiving elements, and wherein the pulse shapers each generate a pulse with the coincidence time as a pulse width in case the associated receiving elements receive signals.

11. The device in accordance with claim 1, wherein the receiving elements are avalanche photodiodes.

12. The device in accordance with claim 1, wherein the transmitting device comprises an infrared light laser.

13. A method for determining a distance to an object, wherein signals are emitted, wherein signals are received and, starting therefrom, detection signals are generated, wherein the distance to the object is determined from the detection signals in accordance with the time-of-flight method and while, a number of detection signals generated within a presettable coincidence time at least equals a presettable coincidence depth, wherein, starting from a background radiation measurement, the coincidence time and/or the coincidence depth are/is determined, wherein, in a background radiation measurement, the background radiation detection signals are evaluated using a current coincidence time and a current coincidence depth, wherein a number of background radiation detection signals acquired in the background radiation measurement is compared to an event set value, and wherein, in case the number of background radiation detection signals and the event set value differ beyond a presettable threshold value, at least the coincidence time and/or the coincidence depth is determined starting from the number of background radiation detection signals.

* * * * *